(12) United States Patent
Bauer et al.

(10) Patent No.: US 6,837,349 B2
(45) Date of Patent: Jan. 4, 2005

(54) HYDRODYNAMIC CLUTCH, PARTICULARLY TORQUE CONVERTER

(75) Inventors: Thomas Bauer, Grossbardorf (DE); Peter Frey, Gerolzhofen (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/379,486

(22) Filed: Mar. 4, 2003

(65) Prior Publication Data

US 2003/0183469 A1 Oct. 2, 2003

(30) Foreign Application Priority Data

Mar. 28, 2002 (DE) .......................................... 102 13 950

(51) Int. Cl.[7] .............................................. F16H 45/02
(52) U.S. Cl. ........................................................ 192/3.3
(58) Field of Search .................................. 192/3.29, 3.3

(56) References Cited

U.S. PATENT DOCUMENTS 5,667,043 A * 9/1997 Dehrmann et al. ........ 192/3.29
6,016,894 A * 1/2000 Kundermann ............... 192/3.3
6,076,642 A * 6/2000 Illig et al. ................... 192/3.29
6,290,041 B1 9/2001 Bechmann et al. ........ 192/3.29

FOREIGN PATENT DOCUMENTS

JP          11-08267 A  *  3/1999  ........... F16H/41/24

* cited by examiner

*Primary Examiner*—Richard M. Lorence
(74) *Attorney, Agent, or Firm*—Cohen, Pontani, Lieberman & Pavane (57) ABSTRACT

In a hydrodynamic clutch with a lockup clutch, a hydraulic fluid is in operative connection with a piston space outside of a driven shaft constructed as a hollow shaft by means of a plurality of fluid channels. The piston space adjoins an actuation piston by means of which the lockup clutch can be actuated. The fluid channels extend substantially axially in a partial portion. In the partial portion, the fluid channels are surrounded on the radial inside by the driven shaft and are surrounded on the radial outer side and in circumferential direction by a hub part.

10 Claims, 7 Drawing Sheets

HYDRODYNAMIC CLUTCH, PARTICULARLY TORQUE CONVERTER

BACKGROUND OF THE INVENTION

1. Field of the Invention

The present invention is directed to a hydrodynamic clutch, particularly a torque converter, having an impeller wheel connected to a drive element so as to be fixed with respect to rotation relative to it which drive element can be connected to a drive shaft so as to be fixed with respect to rotation relative to it. A turbine wheel can be driven hydrodynamically by the impeller wheel, and the turbine wheel is connected, directly or by means of a torsional vibration damper, to a driven shaft so as to be fixed with respect to rotation relative to it. The turbine wheel can be coupled to the impeller wheel by means of a lockup clutch, an actuation piston is associated with the lockup clutch, the driven shaft is constructed as a hollow shaft, and the actuation piston can be acted upon by hydraulic fluid by means of the driven shaft and a hub part. The hydraulic fluid is in operative connection with a piston space adjoining the actuation piston via a plurality of fluid channels outside of the driven shaft, and the fluid channels extend substantially axially in a an inner portion. Every fluid channel in the inner portion is surrounded on the radial outer side by the hub part.

2. Description of the Related Art

A torque converter of the type mentioned above is known, for example, from U.S. Pat. No. 6,290,041. In this torque converter, the hub part comprises two components, between which are formed the fluid channels.

This construction is already quite advantageous, but is still capable of improvement. In particular, in U.S. Pat. No. 6,290,041 it is required either to stamp out the two parts, as such, in a suitable manner—e.g., by forging—or to press an adapter or adjusting piece into one of the two parts. Both production methods are comparatively uneconomical.

SUMMARY OF THE INVENTION

It is the object of the present invention to provide a hydrodynamic clutch in which the boundaries of the fluid channels, insofar as they extend axially in the inner portion, can be adjusted in a simpler manner.

This object is met in that every fluid channel in the inner portion—in addition to being defined on the radial outer side by the hub part—is also surrounded in circumferential direction by the hub part and is surrounded on the radial inside by the driven shaft.

In this case, it is no longer necessary for the hub part to be divided into two components and it is necessary only to form the fluid channels in radially extending outer portions.

When the hub part is constructed conically on the radial inside in channel areas in which it defines the fluid channels on the radial outside, the hub part can be produced in a particularly simple manner in technical respects regarding manufacture. This is particularly true when a cone angle of the hub part in the channel areas is between three and ten degrees, particularly between five and seven degrees.

When the hub part is constructed so as to be cylindrical on the radial inside in intermediate areas in which it limits the fluid channels in circumferential direction, this results in a particularly good delimitation in circumferential direction.

When the intermediate areas describe an inner diameter and the inner diameter is greater than the outer diameter of the driven shaft by 0.5 to 2.0 mm, particularly by 0.8 to 1.2 mm, there is no risk of a direct contact between the hub part and the driven shaft.

The hub part is preferably constructed as a forged part which is subsequently machined in the intermediate areas on the radial inside by turning.

When the number of fluid channels equals at least three, particularly exactly four, a pre-centering of the driven shaft and of the hub part is carried out in a simple manner when the hydrodynamic clutch is assembled.

As a rule, the fluid channels have outer portions which extend substantially radially and open out into the piston space. The fluid channels can be constructed in the outer portions as bore holes. Alternatively, the hub part can comprise two components between which fluid channels are formed.

Further advantages and details are indicated in the following description of an embodiment example in connection with the schematic drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
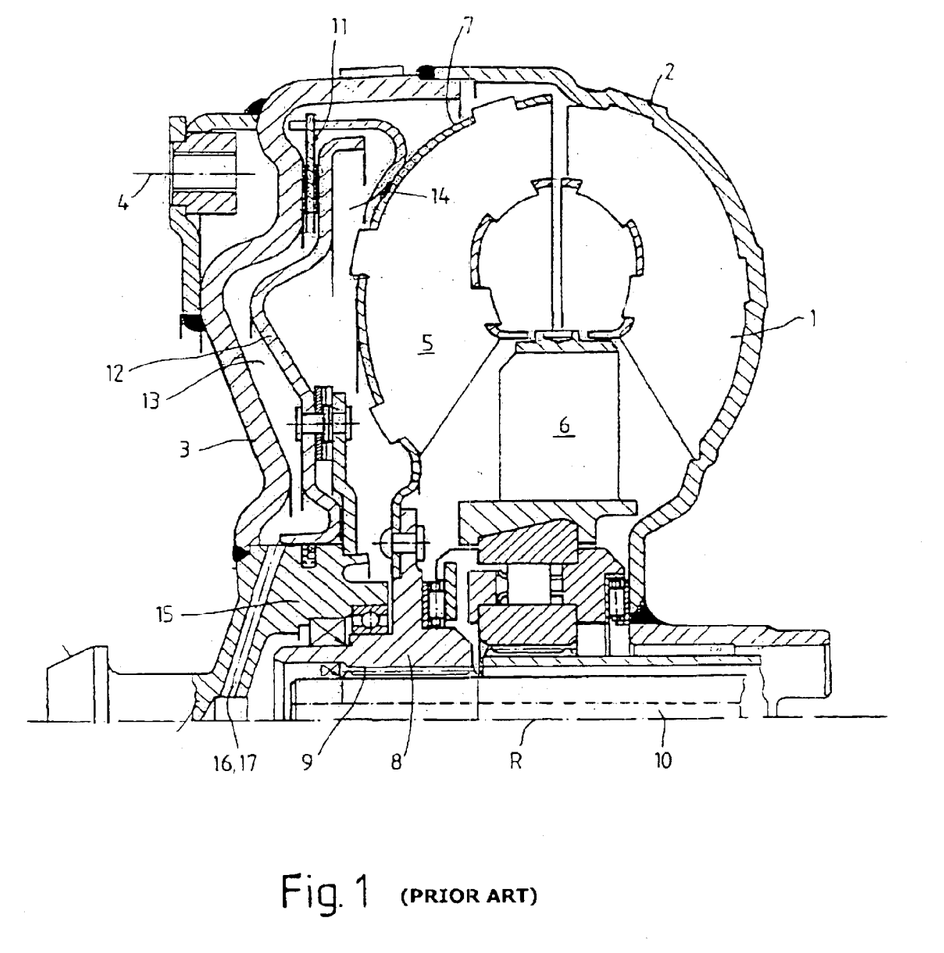
FIG. 1 shows a partial section through a conventional hydrodynamic clutch.

According to FIG. 1, a hydrodynamic clutch has an impeller wheel 1. The impeller wheel 1 is connected with an impeller wheel shell 2 so as to be fixed with respect to rotation relative to it. The impeller wheel shell 2 is connected to a housing shell 3 so as to be fixed with respect to rotation relative to it. According to FIG. 1, the impeller wheel shell 2 is welded to the housing shell 3. However, other types of fastening are conceivable, particularly screw fastening.

The housing shell 3 is a drive element which can be connected by means of screw connections 4, indicated schematically, to a drive shaft, not shown, (generally the crankshaft of an internal combustion engine of a motor vehicle) so as to be fixed with respect to rotation relative to it.

Further, the hydrodynamic clutch has a turbine wheel 5. The turbine wheel 5 can be driven hydrodynamically by the impeller wheel 1. A stator wheel 6 is arranged between the impeller wheel 1 and the turbine wheel 5. Therefore, the hydrodynamic clutch is constructed as a torque converter.

The turbine wheel 5 is connected to a turbine wheel hub 8 via a turbine wheel shell 7. The turbine wheel hub 8 is connected to a driven shaft 10 via a teeth 9. The driven shaft 10 is generally the transmission input shaft of a transmission which is arranged following the hydrodynamic clutch.

According to FIG. 1, the turbine wheel shell 7 is connected to the turbine wheel hub 8 directly and, therefore, so as to be fixed with respect to rotation relative to it. However, a torsional vibration damper could also be arranged between the turbine wheel shell 7 and the turbine wheel hub 8. In this case, the turbine wheel shell 7 would be connected to the turbine wheel hub 8 so as to be limited with respect to rotation.

Further, the hydrodynamic clutch has a lockup clutch 11. The turbine wheel 5 can be coupled with the impeller wheel 1 by means of the lockup clutch 11. According to FIG. 1, the impeller wheel 1 and turbine wheel 5 are coupled directly and so as to be fixed with respect to relative rotation. Again, a torsional vibration damper could also be arranged between the lockup clutch 11 and the turbine wheel shell 7 in this case. This torsional vibration damper can be provided alternatively or in addition to the torsional vibration damper between the turbine wheel shell 7 and the turbine wheel hub 8.

An actuation piston 12 is associated with the lockup clutch 11. The lockup clutch 11 can be actuated by means of the actuation piston 12. For this purpose, hydraulic fluid is conducted either into a front piston space 13 or into a rear piston space 14. The actuation piston 12 is accordingly acted upon by the hydraulic fluid. Hydraulic fluid is withdrawn in a corresponding manner from the other respective piston space 14, 13. As can be seen from FIG. 1, the front piston space 13 is arranged between the housing shell 3 and the actuation piston 12, the rear piston space 14 is arranged between the actuation piston 12 and the turbine wheel shell 7. The two piston spaces 13, 14 accordingly adjoin the actuation piston 12.

The admission of hydraulic fluid to the actuation piston 12 is effected by means of the driven shaft 10 and a hub part 15. The driven shaft 10 is therefore constructed as a hollow shaft 10 for guiding the hydraulic fluid.

Outside of the driven shaft 10, the hydraulic fluid is in an operative connection with the front piston space 13 via a quantity of fluid channels 16. The fluid channels 16 have outer portions 17, according to FIG. 1, which outer portions 17 extend substantially radially and open out into the front piston space 13.

Figure 2:
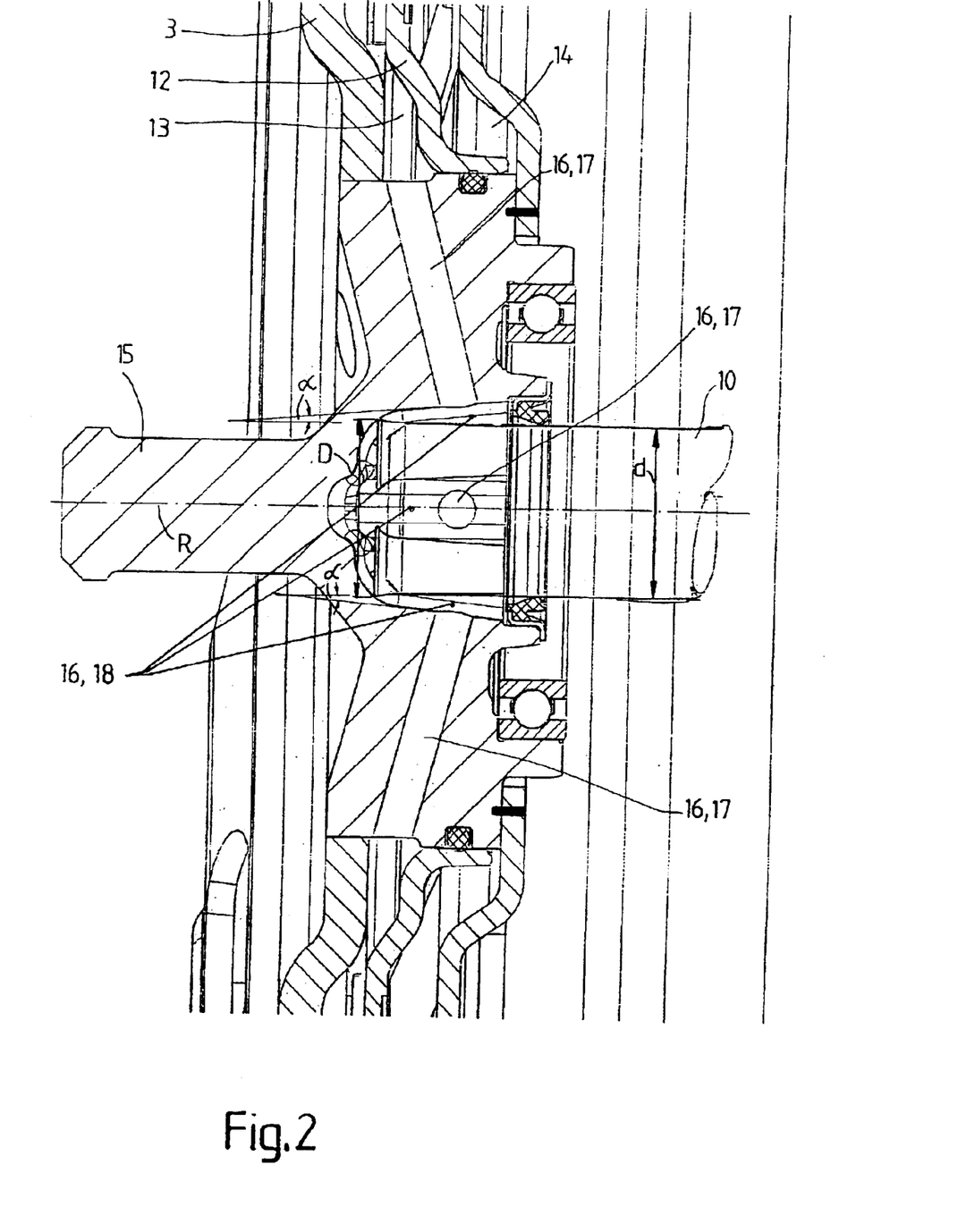
FIG. 2 shows a section through a hub part according to the invention and a driven shaft.

According to FIG. 2, the fluid channels 16 extend axially in inner portions 18. According to FIG. 2, the fluid channels 16 in the inner portions 18 are bounded on the radial outer side by the hub part 15 and are open on the radial inner side facing the driven shaft 10. In the circumferential direction, the fluid channels in the inner portions 18 are likewise bounded by the hub part 15. The areas in which the hub part 15 define the fluid channels 16 on the radial outside of the inner portions 18 are referred to hereinafter as channel areas 19; the portions in which the hub part 15 defines the fluid channels 16 in the inner portions 18 in circumferential direction are referred to hereinafter as intermediate areas 20 (see FIG. 3).

As can be seen especially clearly from FIG. 2, the hub part 15 is conical on the radial inside in the channel areas 19. Accordingly, with an axis of rotation R, it forms a cone angle α. The cone angle α is preferably between three and ten degrees, particularly between five and seven degrees. According to FIG. 2, it is six degrees, for example.

Figure 3:
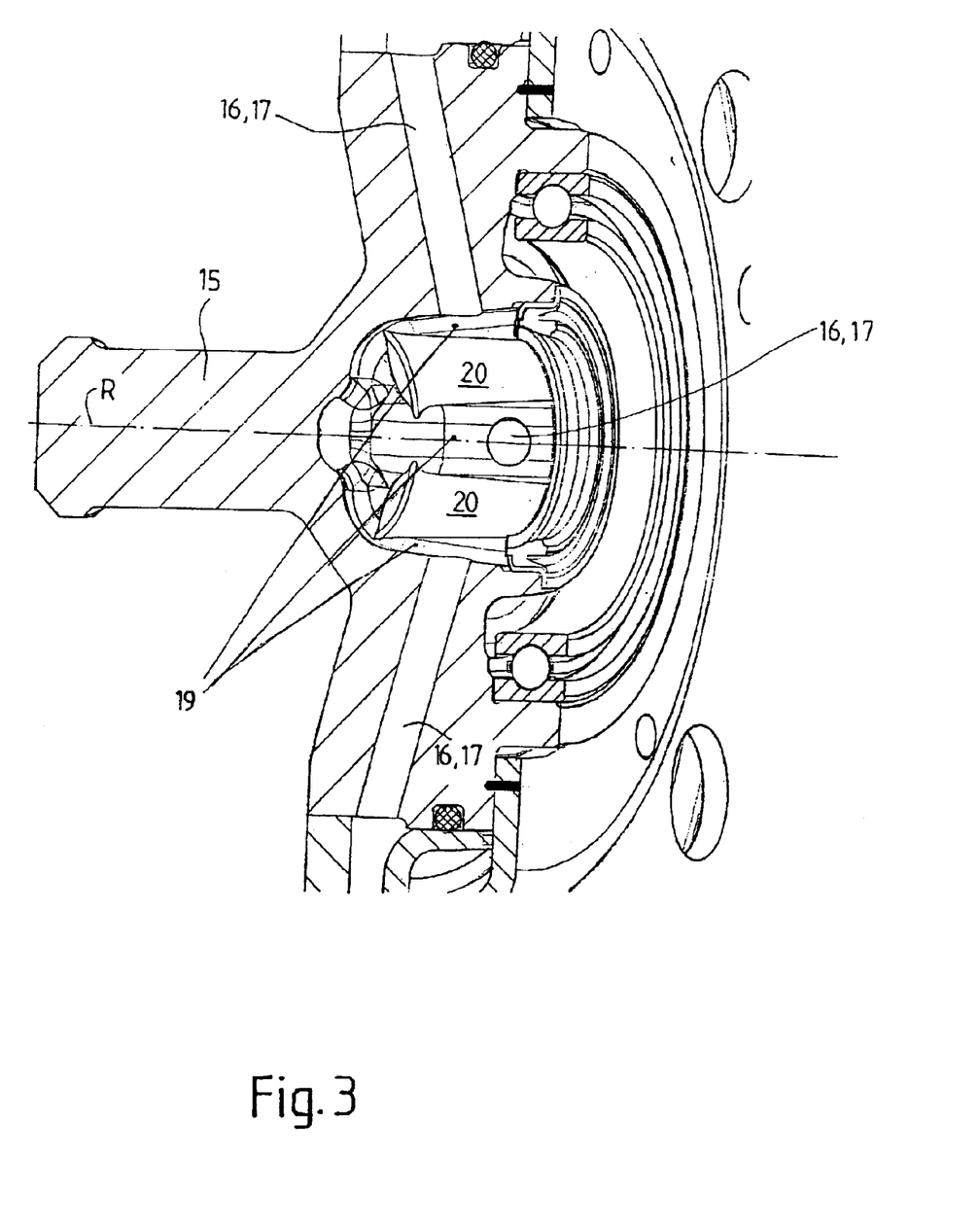
FIG. 3 shows a perspective view of a section through the hub part of FIG. 2.

As can be seen particularly clearly from FIG. 3, the hub part 15 is constructed cylindrically on the radial inner side in the intermediate areas 20. The intermediate areas 20 accordingly describe an inner diameter D. The inner diameter D is greater than an outer diameter d of the driven shaft 10. As a rule, the inner diameter D should be greater than the outer diameter d of the driven shaft 10 by 0.5 to 2.0 mm. It is preferably greater than the outer diameter by 0.8 to 1.2 mm, e.g., by 1.0 mm.

Figure 4:
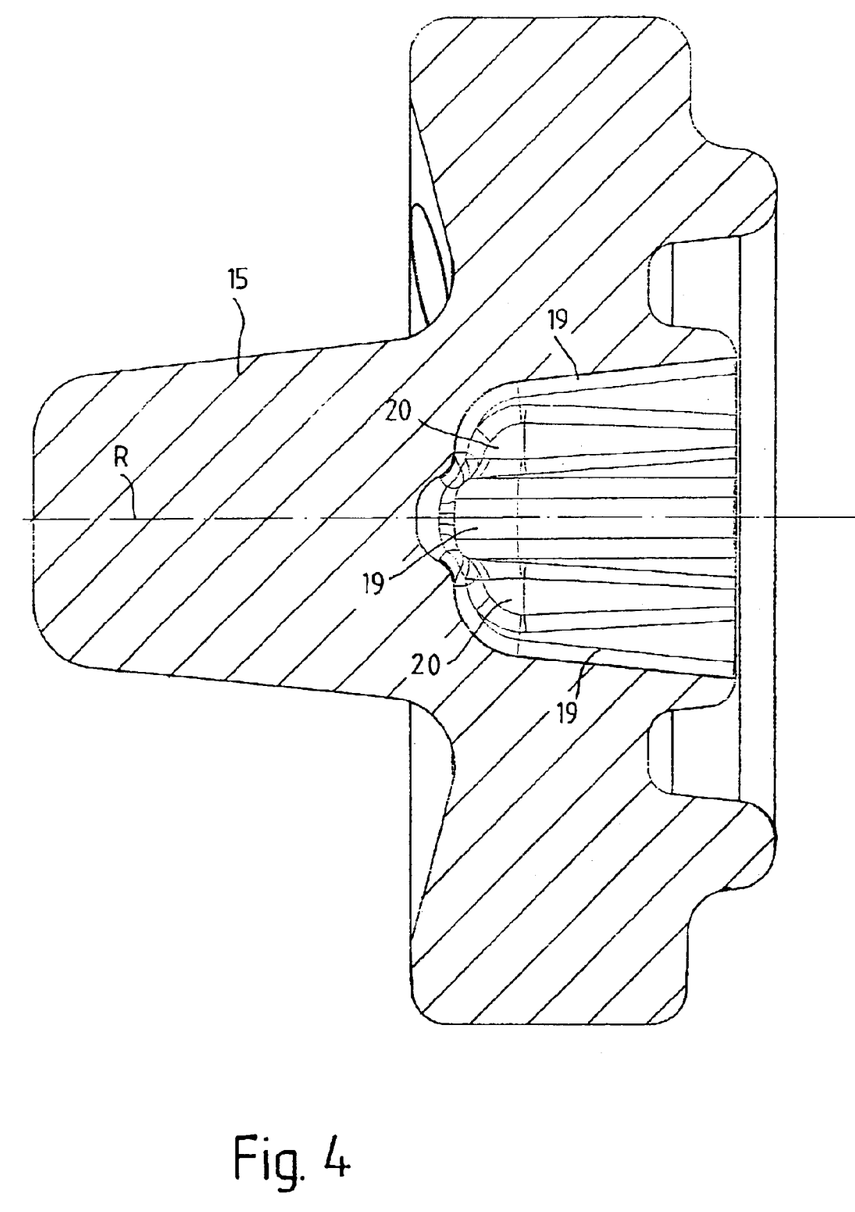
FIG. 4 shows a section through a biscuit or forging blank.
Figure 5:
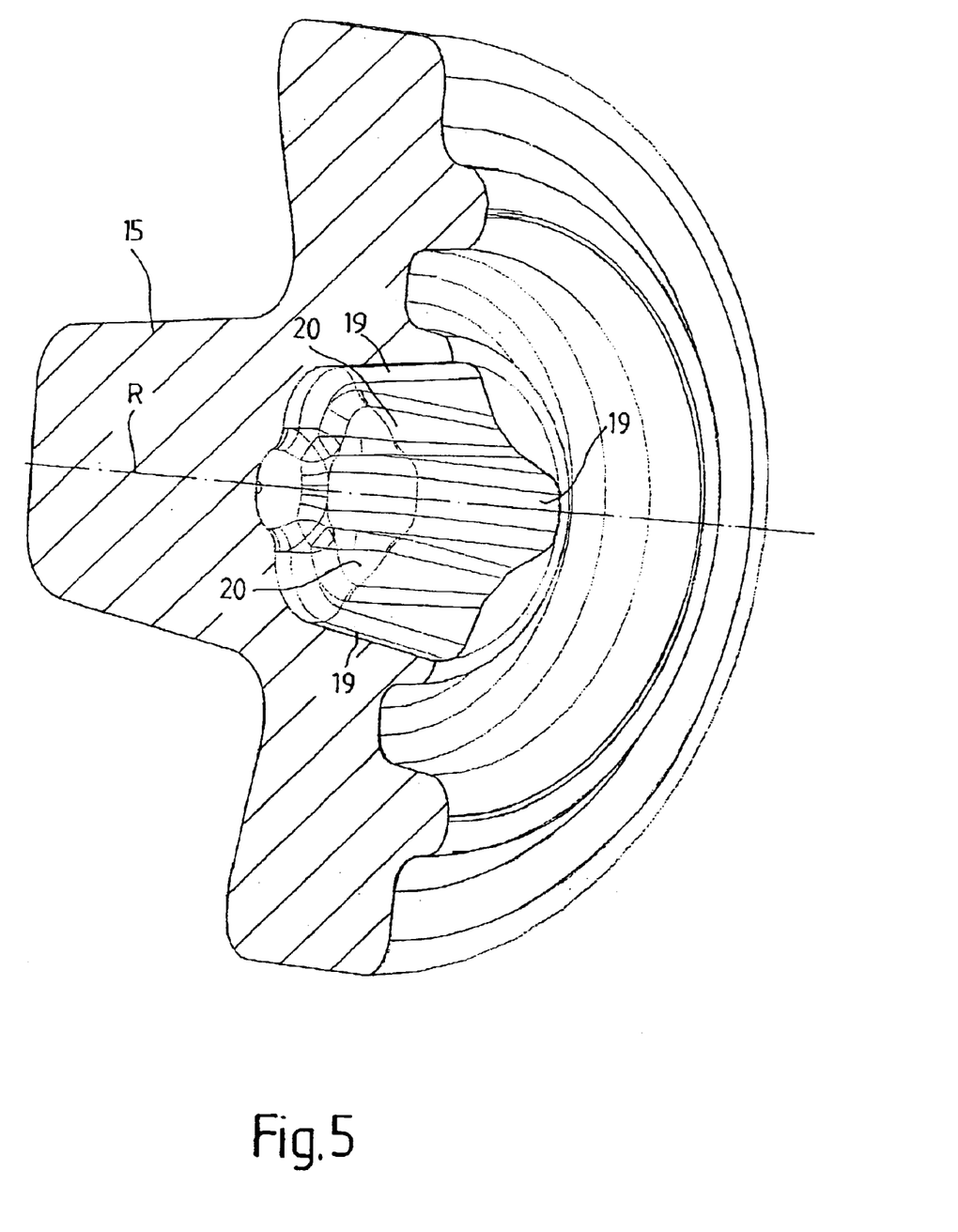
FIG. 5 shows a perspective view of the section in FIG. 4.
Figure 6:
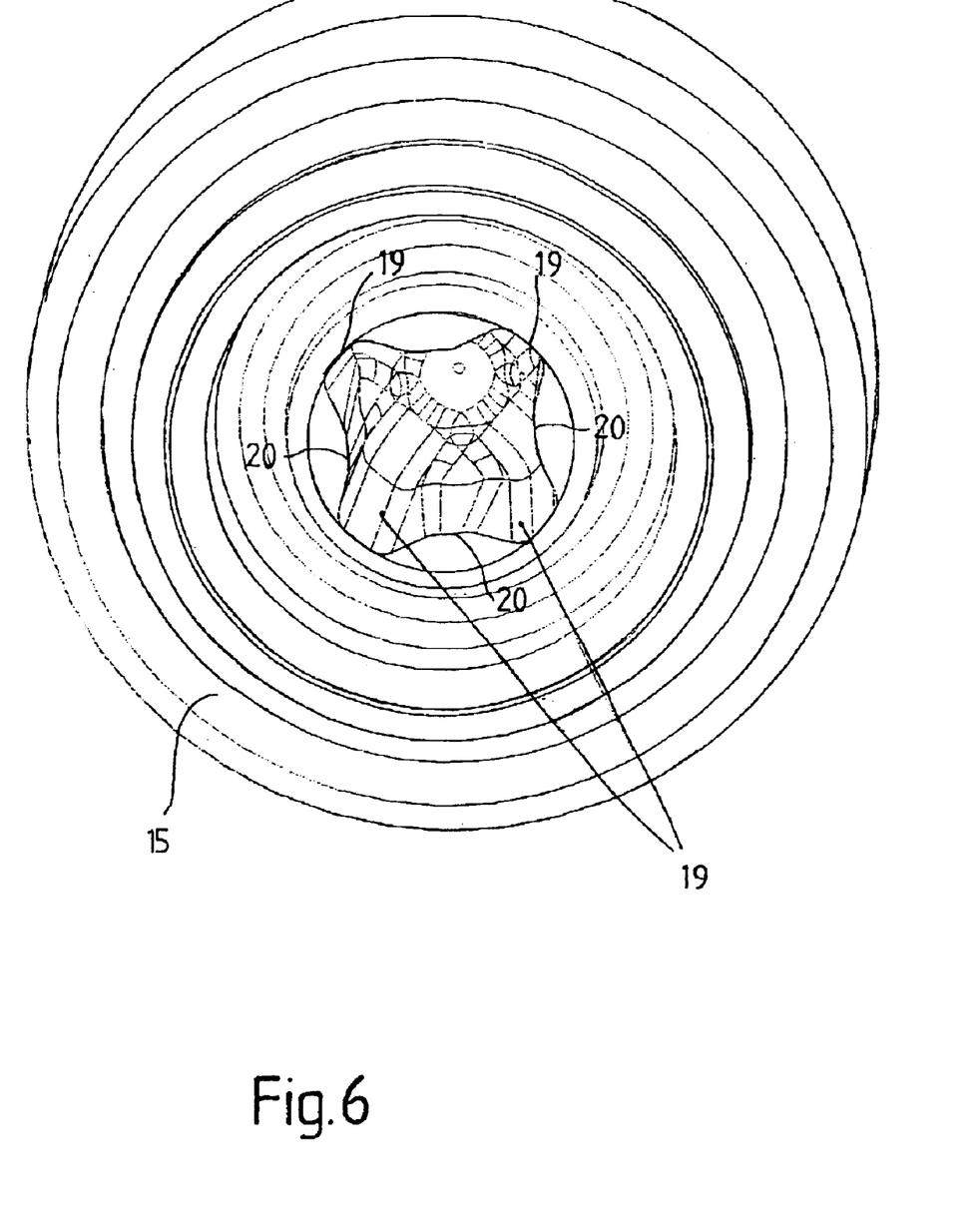
FIG. 6 shows a perspective view of the forging blank in FIG. 4.

The conical shape of the hub part 15 in the channel areas 19 can be achieved in a particularly simple manner in that a correspondingly shaped forging die is initially pressed into a blank from which the hub part 15 is produced subsequently. The cylindrical shape of the intermediate areas 20 can then be achieved by turning. The hub part 15 is accordingly preferably constructed as a forged part which is machined subsequently by turning in the intermediate areas 20 on the radial inside. FIGS. 4 to 6 show a forged blank of this kind after the die has been pressed in and before the intermediate areas 20 have been finished.

As can be seen particularly clearly from FIG. 6, the number of fluid channels 16 is exactly four. Further, the fluid channels 16 are arranged so as to be distributed uniformly in circumferential direction around the driven shaft 10. However, the hub part 15 could also be constructed in such a way that it forms a different quantity of fluid channels 16 with the driven shaft 10. At least three fluid channels 16 should be formed. Also, the uniform distribution around the drive shaft 10 should always be maintained.

Figure 7:
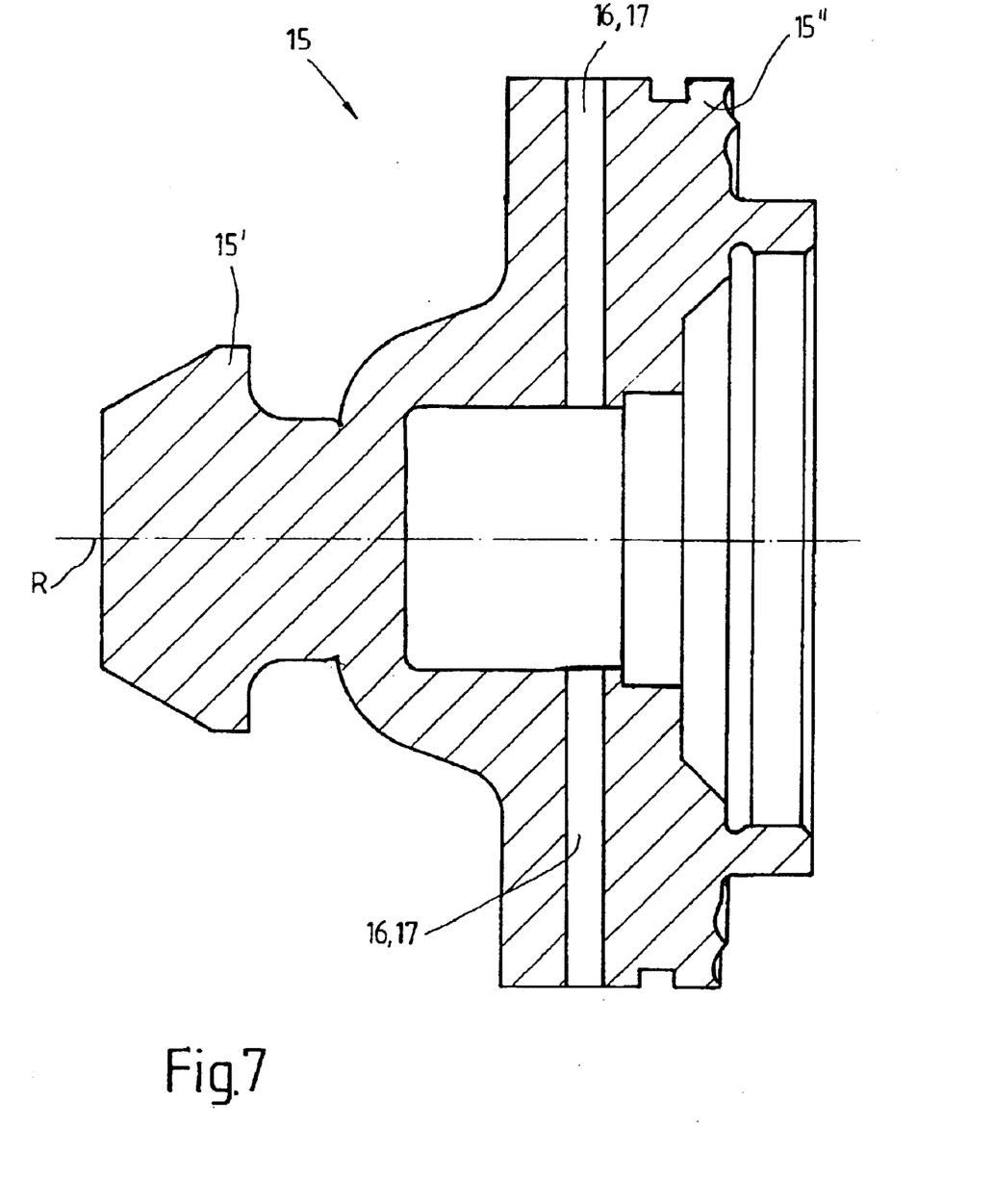
FIG. 7 shows an alternative construction of the hub part.

In the first embodiment form of the hub part 15 described above in connection with FIGS. 1 to 6, this hub part 15 is constructed in one piece. Therefore, the fluid channels 16 are constructed in the outer portions 17 as bore holes 17. However, it is also possible that the hub part 15 comprises two components 15', 15" according to a second embodiment form, see FIG. 7. In this case, the components 15', 15" can form the outer portions 17 of the fluid channels 16 between themselves. The connection of the components 15', 15" can be carried out in any desired manner. In particular, components 15', 15" can be connected with one another so as to be detachable, e.g., by means of screwing. However, they can also be permanently connected with one another, e.g., by welding or riveting.

Accordingly, with the present invention, the fluid channels 16 can be formed in a simple manner with only a one-piece hub part 15 or with two simply constructed hub part components 15', 15" and the driven shaft 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic clutch comprising:
   a drive element which can be connected to a drive shaft so as to be fixed against rotation relative to said drive shaft, said drive shaft having an axis of rotation;
   an impeller wheel connected to said drive element so as to be fixed against rotation relative to said drive element;
   a turbine wheel which can be connected to a driven shaft so as to be fixed against rotation relative to said driven shaft, wherein said turbine wheel can be hydrodynamically driven by said impeller wheel,
   a lock-up clutch which can couple said turbine wheel to said impeller wheel;
   an actuation piston associated with said lock-up clutch;
   a piston space between said actuation piston and said drive element; and
   a hub part having an axially central recess which receives said driven shaft and a plurality of fluid channels for conveying hydraulic fluid from said driven shaft to said piston space, each said fluid channel having an inner portion which extends substantially axially, each said inner portion being bounded radially inside by said recess and being open facing the driven shaft.

2. A hydrodynamic clutch as in claim 1 wherein each said inner portion comprises a radially outside channel area which forms a cone angle with the axis of rotation.

3. A hydrodynamic clutch as in claim 2 wherein said cone angle is between five and seven degrees.

4. A hydrodynamic clutch as in claim 1 wherein said hub part further comprises intermediate areas which separate said inner portions circumferentially, said intermediate areas forming an inward facing cylindrical surface which is interrupted circumferentially by said axially extending inner portions of said fluid channel.

5. A hydrodynamic clutch as in claim 4 wherein said cylindrical surface has a diameter which is 0.8 mm to 1.2 mm larger than the diameter of said driven shaft.

6. A hydrodynamic clutch as in claim 4 wherein said hub part is a forged part which is machined to form said inward facing cylindrical surface.

7. A hydrodynamic clutch as in claim 1 comprising at least three said fluid channels uniformly distributed around said recess.

8. A hydrodynamic clutch as in claim 1 wherein each said fluid channel has an outer portion which extends substantially radially and opens out into said piston space.

9. A hydrodynamic clutch as in claim 8 wherein said outer portions are formed by boring.

10. A hydrodynamic clutch as in claim 8 wherein said hub part is formed in two parts which are joined to form said outer portions of said fluid channels between said two parts.

* * * * *